UNITED STATES PATENT OFFICE.

SAMUEL P. SADTLER, OF PHILADELPHIA, PENNSYLVANIA.

PROCESS OF MAKING LEATHER.

SPECIFICATION forming part of Letters Patent No. 556,325, dated March 10, 1896.

Application filed February 8, 1894. Serial No. 499,455. (Specimens.)

*To all whom it may concern:*

Be it known that I, SAMUEL P. SADTLER, a citizen of the United States, residing at Philadelphia, Pennsylvania, have invented certain Improvements in Processes of Making Leather, of which the following is a specification.

My invention relates to a new process for the treatment of hides for the purpose of making leather in connection with what is termed "chrome tanning."

It is known that if hides or skins are impregnated with a chromate, such as bichromate of potash, and an acid, such as hydrochloric or sulphuric acid, and then submitted to the action of a reducing agent sufficiently rapid in its action, chromic oxide is separated out through the body of the skin and an insoluble leather possessing numerous excellent qualities is obtained. Various reducing agents have been proposed, such as hyposulphite or sulphite in the presence of an acid, hydrogen sulphide either as gas or evolved from a metallic sulphide in the presence of an acid, besides a variety of substances, such as ferrous sulphate, cuprous sulphate or chloride, oxalic acid, &c., of greater or less activity. I do not desire to use any of these in my process, but have discovered that superior results are attained by the use of hydrogen dioxide as the agent for causing the separation out of the chromic oxide in the skin. While hydrogen dioxide is usually considered as an oxidizing agent, and indeed is capable under certain conditions of changing chromic oxide into chromic acid, yet I am able in this case to take advantage of the mutual decomposition with liberation of oxygen from both compounds, which takes place when hydrogen dioxide is brought in contact with chromic acid or acidified bichromate of potash.

I have found that a skin impregnated with acidified bichromate of potash (or bichromate of potash with free acid) when dipped into a dilute solution of hydrogen dioxide will instantly change in color, and that the mutual decomposition before referred to will go on steadily with the escape of oxygen gas, if sufficient hydrogen dioxide is present, until all the chromic acid has been reduced to chromic oxide.

The first effect of the hydrogen dioxide upon the bichromate of potash in the skin, if the bath be acid, is to form a deep-blue color, due, according to some authorities, to a perchromic acid, and according to others to a compound of the chromic acid with the hydrogen dioxide; but this does not effect the result, as it is unstable in aqueous solution and disappears in a few minutes, when the green color of the reduction product of the chromic acid shows itself. As the reduction proceeds the skin changes from yellow to a light bluish or greenish color, or, as it may appear while still wet, slate-colored.

The essential part of my invention is the use of this superior method of reducing the bichromate. As the hydrogen dioxide in decomposing breaks up into $H_2O$ and $O$, there is nothing foreign or injurious added to the hide in the leather-making process or set free in the bath to injuriously affect the product. This is an important advantage over all the other reducing agents hitherto used. There is no separated sulphur requiring prolonged washing out, no sulphuric acid formed by the oxidation of the reducing agent, and no oxides of iron or copper formed to modify the character of the product. At the same time the reaction is a quick one and the bichromate is changed in the hide before it can diffuse or "bleed" out and so be reduced in the bath only, as takes place with slow reducing agents.

I have found, moreover, that it is not necessary to have the hydrogen dioxide ready prepared in solution, but I may get the same results by the use of such peroxides as will produce hydrogen dioxide with dilute acids, as barium peroxide, sodium peroxide, and others of similar properties. I therefore wish to be allowed to substitute these, if in any case it seems advisable, for the ready-formed hydrogen dioxide.

In carrying out my invention I prefer to proceed as follows: I take any hides properly prepared for tanning, whether simply bated or bated and drenched, or may use pickled hides, and after submitting them to the action of a solution of bichromate of potash in the presence of an acid—such as hydrochloric or sulphuric acid—(or it may be without the acid if they be pickled hides) until they are thoroughly impregnated I drain them from the adhering liquor and put them into a bath containing hydrogen dioxide or the materials capable of producing it. The bath is kept slightly acid with hydrochloric or sulphuric acid, and the hydrogen dioxide or metallic peroxide for its generation is added in small successive portions, so that the mutual decomposing action with the chromic acid in the skin goes on steadily, but without loss of available oxygen from the decomposition of the dioxide in the bath. The bichromated hides, while subjected to this treatment in the hydrogen dioxide bath, should by preference be kept in agitation, either by the paddles of a reel or other means, for the double purpose of exposing them uniformly to the action of the decomposing agent and to free them from the oxygen gas which escapes from the surface of the hide in minute bubbles. A point of importance to be noticed in connection with this use of the hydrogen-dioxide bath is that no metallic surfaces should be exposed to the action of the solution, (wood only being used for the containing-vats and paddle-wheels,) as otherwise considerable hydrogen dioxide will be decomposed without doing effective work on the skins.

I have used the following proportions in carrying out some experiments, with good results: One-half pound of potassium bichromate and one-quarter pound hydrochloric acid of 21° Baumé for ten pounds of skins, and the bath used was two ounces of ten-volume hydrogen-dioxide solution for one pound of bichromated skin; but while I give these proportions it will be understood that I do not limit myself to them.

I claim as my invention—

1. The process herein described of making leather, said process consisting in first impregnating the hide with a chromate and an acid, second, submitting the hide to the action of hydrogen dioxide as a reducing agent, substantially as set forth.

2. The process herein described of making leather, said process consisting in first impregnating the hide with a chromate and an acid, second, treating the hide so prepared in a bath of dilute acid and a peroxide which will form hydrogen dioxide, substantially as described.

3. The process herein described of making leather, said process consisting in first impregnating the hide with a chromate and acid, second, treating the hide so prepared in a bath with a dilute acid and sodium peroxide, substantially as described.

In testimony whereof I have signed my name to this specification in the presence of two subscribing witnesses.

SAMUEL P. SADTLER.

Witnesses:
 ALEX. RAMSEY,
 FRANK BECHTOLD.